C. R. SCOTT.
AUTOMOBILE MUFF.
APPLICATION FILED APR. 15, 1920.
1,351,303.
Patented Aug. 31, 1920.
2 SHEETS—SHEET 1.
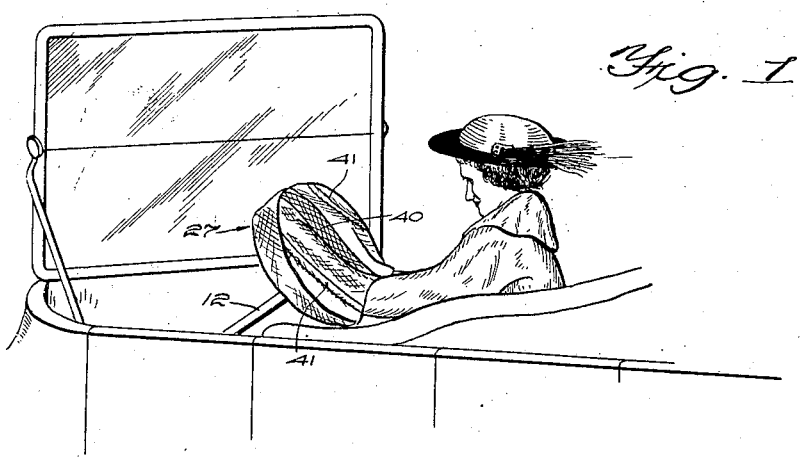
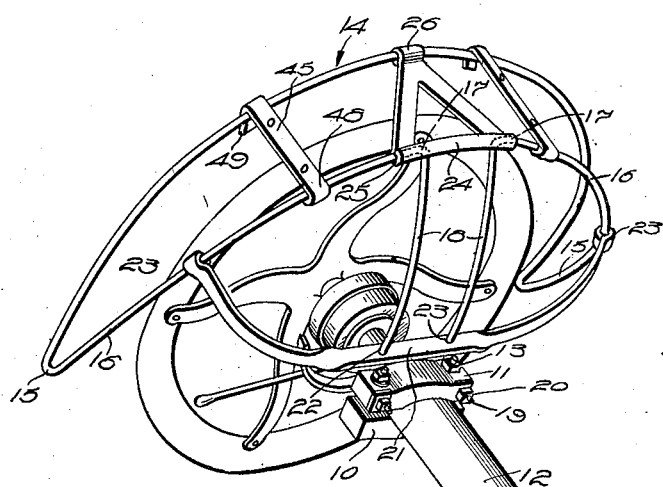
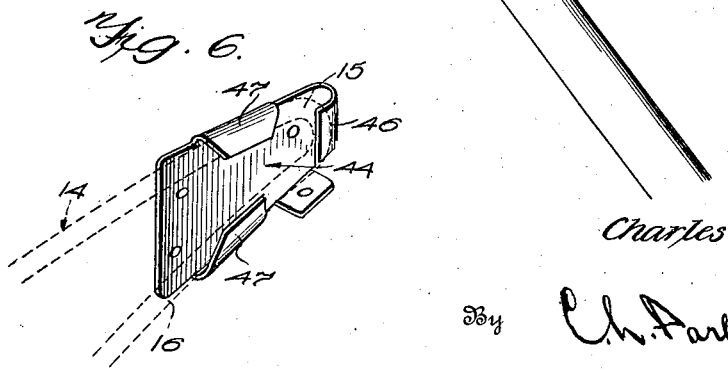
Inventor
Charles R. Scott
By
Attorney C. R. SCOTT.
AUTOMOBILE MUFF.
APPLICATION FILED APR. 15, 1920.
1,351,303.
Patented Aug. 31, 1920.
2 SHEETS—SHEET 2.
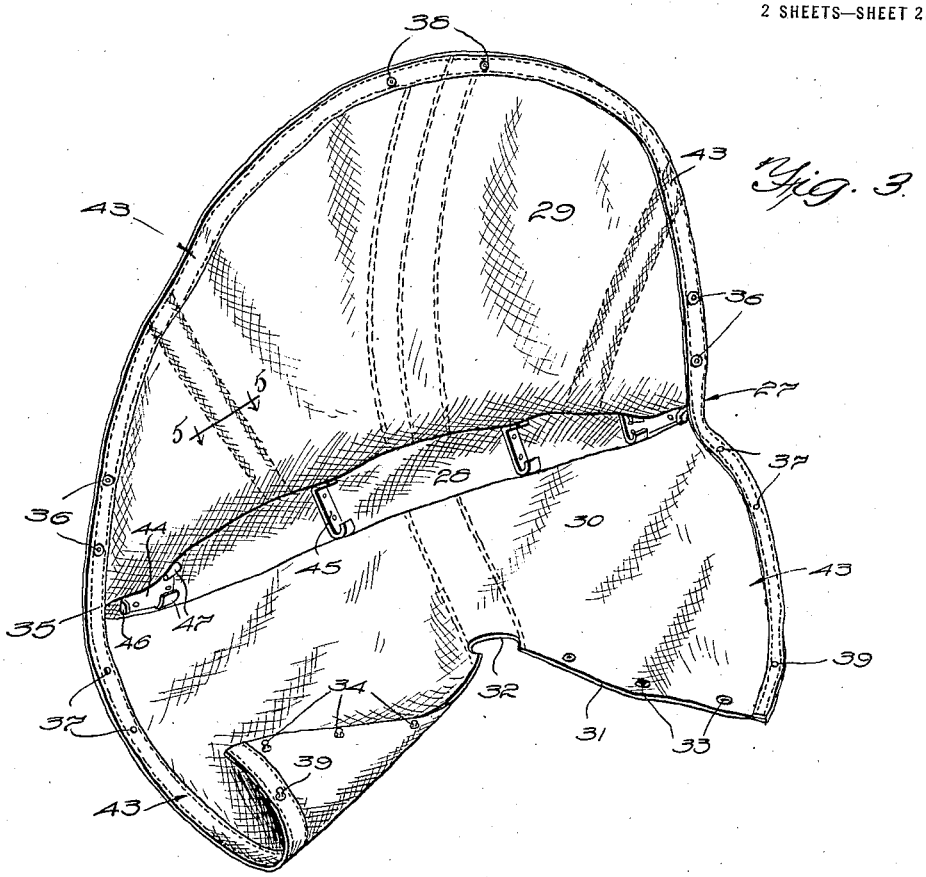
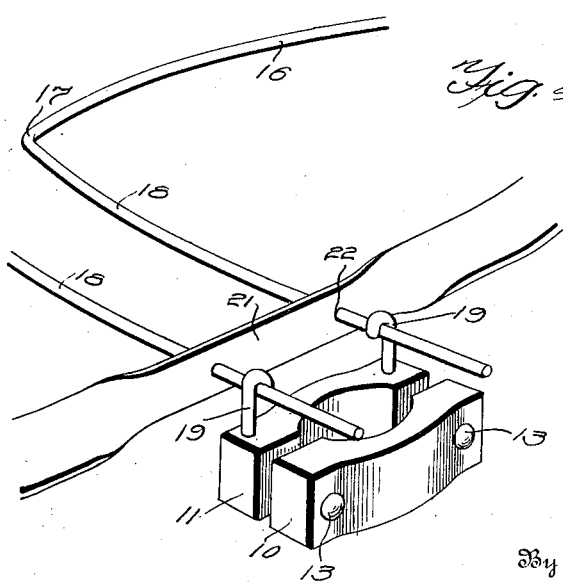
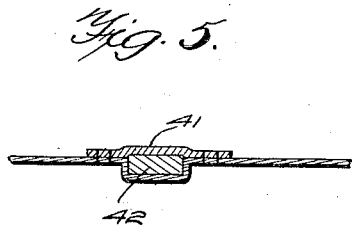
Inventor
Charles R. Scott,
By
Attorney

UNITED STATES PATENT OFFICE.

CHARLES R. SCOTT, OF WYANDOTTE, OKLAHOMA.

AUTOMOBILE-MUFF.

1,351,303. Specification of Letters Patent. Patented Aug. 31, 1920.

Application filed April 15, 1920. Serial No. 374,153.

*To all whom it may concern:*

Be it known that I, CHARLES R. SCOTT, a citizen of the United States, residing at Wyandotte, in the county of Ottawa and State of Oklahoma, have invented certain new and useful Improvements in Automobile-Muffs, of which the following is a specification.

This invention relates to improvements in automobile steering wheel muffs, and more particularly to a device adapted for attachment to the steering post of an automobile.

An object of the invention is to provide a device of the above mentioned character which may be attached to the steering post of an automobile and which will protect the hands of the driver without in any way interfering with the operation of the machine.

A further object of the invention is to provide a substantially rigid frame-work having detachably secured thereto a fabric covering which may be readily thrown back over the steering wheel when not in use, or entirely removed from the frame-work.

Other objects and advantages of the invention will become apparent during the course of the following description.

In the accompanying drawings, forming a part of this specification, wherein like numerals are employed to designate like parts throughout, Figure 1 is a perspective of portions of an automobile showing my device in use.

Fig. 2 is a perspective of the steering post and wheel showing the frame-work attached thereto.

Fig. 3 is a perspective of the fabric covering attached.

Fig. 4 is a fragmentary perspective of the attaching means of the frame-work and associated elements.

Fig. 5 is a section taken on the line 5—5 of Fig. 3, and

Fig. 6 is a perspective of one of the clips used in attaching the fabric to the frame-work.

In the drawings wherein for the purpose of illustration is shown a preferred embodiment of my invention, the numerals 10 and 11 designate coacting clamping blocks adapted to be clamped about the steering post 12 of an automobile by means of bolts 13 or the like.

A wire frame-work is provided comprising a substantially semi-circular portion 14, bent back upon itself at points 15 to form lower frame portions 16, corresponding in shape to the semi-circular portion 14. The lower frame portions 16 diverge from the upper frame portion 14 toward the center, and are bent inwardly as at 17 to form substantially parallel attaching portions 18.

Hook clamps 19 extend through one of the clamping blocks 10 or 11, each of the hooks being adapted to receive one of the parallel attaching portions 18 of the frame. The lower ends of the hook clamps are threaded and receive nuts 20, whereby the ends of the parallel portions 18 may be drawn down tightly against the clamping blocks.

A supporting and spacing bar 21 is provided, having openings 22 through which the parallel portions 18 of the frame-work extend. The ends of the bar 21 are curved upwardly and provided with loops 23 which receive the lower frame portion 16 to support the same. A clip 24 is provided having at its lower end spacing loops 25 which engage the frame-work at the bends 17 thereof, and hold the forward ends of the parallel portions 18 of the frame in spaced relation. The clip 24 is also provided at its upper end with a looped portion 26, secured to the upper frame portion 14, whereby to hold the upper and lower frame portions in the proper spaced relation.

A fabric covering 27 is provided, comprising a central portion 28, which has its greatest width in the center and tapers toward its ends, an upper cover section 29, and a lower cover section 30. The lower cover section has a slit 31 formed therein which communicates approximately centrally of the portion 30 with an opening 32, which is adapted to receive the steering post 12. The numerals 33 and 34 designate respectively the socket and head members of snap fasteners secured on opposite sides of the slit 31.

The outer edges of the cover sections 29 and 30 are suitably bound by means of tape 35, or the like. The cover sections 29 and 30 are provided upon their bound edges, adjacent the center portion 38, with socket and head members 36 and 37 of snap fasteners. The free edges of the cover sections are also provided adjacent their centers with socket and head members 38 and 39 of snap fasteners. The upper cover section is provided, preferably centrally thereof, with a reinforcing strip 40. The upper cover section is also provided at spaced intervals upon each side of the reinforcing strip 40 with strips 41, preferably of fabric forming a pocket for the reception of stiffening members 42. The stiffening members 42, when the device is in use, tend to keep the upper cover section 29 flat, preventing the fabric from sagging downwardly and interfering with the hands of the operator.

As will be noted by inspecting Fig. 3, when the snap fasteners are secured in position, spaces 43 are provided, which are not closed by the fasteners, thus providing openings through which the hands of the driver may be inserted. I prefer that the reinforcing members 42 be disposed longitudinally of the cover section 29 and positioned over the spaces 43, whereby they may be supported by the hands and arms of the operator and serve to hold the upper cover section in an extended position.

The center portion 28 of the cover is provided with clips 44 and 45, whereby the cover may be readily attached to or removed from the frame-work. The clips 44 are preferably secured to the center portion 28 of the cover adjacent the ends thereof and are provided upon their outer ends with hook portions 46 adapted to engage the bends 15 of the frame. The edges of the clips 44 are also provided with hook members 47 adapted to receive the ends of the frame sections 14 and 16. The clips 45 are secured to the center portion 28 of the cover, as shown in Fig. 3, and their lower ends terminate in hooks 48 adapted to engage beneath the wire of the lower frame section 16. The upper ends 49 of the clips 45 are bent inwardly at substantially right angles and are adapted to be snapped over the wire of the upper frame section 14, the ends 49 providing sufficient tension upon the frame section 14 to prevent slippage of the clips while in use.

In attaching the cover section to the frame-work the clips 44 are first placed in position, as shown in Fig. 6, the center of the section 28 being allowed to hang downwardly. The center section 28 is then raised into position until the hook ends 48 of the clips 45 engage the lower frame section 16, whereupon the ends 49 are snapped over the upper frame section 14. When it is desired, the snap fasteners may be released and the upper cover section folded up over the frame-work. For example, on days when the hands do not become cold except from the wind, the upper cover section 29 may be folded back entirely, the center section 28 and lower cover section 30 acting as an effective wind break. If desired, the entire cover may be removed by releasing the ends 49 of the clips 45, allowing the center section 28 to drop, and then removing the clips 44 from the end of the frame.

It is to be understood that the form of my invention herein shown and described is to be taken as a preferred example of the same and that various changes may be resorted to in the shape, size, and arrangement of parts without departing from the spirit of the invention or the scope of the subjoined claims.

What I claim is:

1. In a device of the character described, a substantially arcuate frame embodying upper and lower inwardly diverging sections, means to secure the frame to the steering post of an automobile, and a cover secured to said frame.

2. In a device of the character described, a substantially arcuate frame embodying upper and lower inwardly diverging sections, means to detachably secure the frame to the steering post of an automobile, and a cover detachably secured to said frame.

3. In a device of the character described, a substantially arcuate frame embodying upper and lower inwardly diverging sections, a cover comprising a center section and upper and lower cover sections, means to secure the frame to the steering post of an automobile, and means connected with said center section for detachably securing said cover to said frame.

4. In a device of the character described, a substantially arcuate frame embodying upper and lower inwardly diverging sections, a cover comprising a center section and upper and lower cover sections, means to secure the frame to the steering post of an automobile, and clips secured to said center section adapted to engage the upper and lower frame sections to detachably secure said cover to said frame.

5. In a device of the character described, a substantially arcuate frame embodying upper and lower inwardly diverging sections, parallel arms secured to said lower section, a supporting clamp adapted for connection with said parallel arms and a cover detachably secured to said frame.

In testimony whereof I affix my signature in presence of two witnesses.

CHARLES R. SCOTT.

Witnesses:
 ALFRED A. THOMPSON,
 MAUDE L. SCOTT.